(12) United States Patent
Rausch et al.

(10) Patent No.: US 7,896,596 B2
(45) Date of Patent: Mar. 1, 2011

(54) U-SHAPED CLAMPING PIECE

(75) Inventors: Uwe Rausch, Tambach-Dietharz (DE); Marko Göring, Gotha (DE); Eberhard Christ, Tambach-Ditharz (DE)

(73) Assignee: Ejot GmbH & Co. KG, Bad Laasphe (DE)

( * ) Notice: Subject to any disclaimer, the term of this patent is extended or adjusted under 35 U.S.C. 154(b) by 834 days.

(21) Appl. No.: 11/659,664

(22) PCT Filed: Sep. 1, 2005

(86) PCT No.: PCT/EP2005/009417
§ 371 (c)(1),
(2), (4) Date: Jun. 5, 2007

(87) PCT Pub. No.: WO2006/024527
PCT Pub. Date: Mar. 9, 2006

(65) Prior Publication Data
US 2007/0243038 A1    Oct. 18, 2007

(30) Foreign Application Priority Data

Sep. 2, 2004 (DE) .......................... 10 2004 042 564
Dec. 7, 2004 (DE) .......................... 10 2004 058 938

(51) Int. Cl.
*F16B 37/04* (2006.01)
(52) U.S. Cl. ........................................ 411/174; 411/970
(58) Field of Classification Search .................. 411/174, 411/175, 970, 544
See application file for complete search history.

(56) References Cited

U.S. PATENT DOCUMENTS

| 2,378,258 | A | * | 6/1945 | Tinnerman | 411/174 |
| 3,118,480 | A | * | 1/1964 | Kreider | 411/173 |
| 3,145,753 | A |  | 8/1964 | Kreider |  |
| 3,358,729 | A | * | 12/1967 | Munse | 411/175 |
| 3,414,035 | A | * | 12/1968 | Munse | 411/175 |
| 4,333,211 | A |  | 6/1982 | Gunther |  |
| 4,684,305 | A | * | 8/1987 | Dubost | 411/174 |
| 4,883,397 | A | * | 11/1989 | Dubost | 411/174 |
| 4,955,772 | A |  | 9/1990 | Reck et al. |  |
| 5,713,707 | A | * | 2/1998 | Gagnon | 411/175 |
| 5,890,858 | A | * | 4/1999 | Leroux | 411/175 |
| 6,474,917 | B2 |  | 11/2002 | Gauron |  |
| 6,971,830 | B2 | * | 12/2005 | Hulin et al. | 411/175 |

FOREIGN PATENT DOCUMENTS

| CA | 1034854 A | 7/1978 |
| CA | 1278171 C | 12/1990 |
| DE | 26 52 138 A1 | 6/1977 |
| EP | 0 199 614 A1 | 10/1986 |
| EP | 0 353 468 A1 | 2/1990 |
| EP | 1 336 763 A2 | 8/2003 |
| FR | 2 492 015 | 10/1980 |
| GB | 1 562 517 | 11/1976 |

* cited by examiner

*Primary Examiner* — Flemming Saether
(74) *Attorney, Agent, or Firm* — Birch, Stewart, Kolasch & Birch, LLP

(57) ABSTRACT

The invention relates to a U-shaped clamping piece for attachment to a panel provided with an opening, having two flat legs, connected by a yoke, with a nut part axially movably disposed between the two legs for receiving a bolt, said bolt penetrating the opening and one leg, wherein said nut part is non-rotatably held on the clamping piece by a lateral arm. The nut part is secured by its end in axially resilient manner to the leg facing away from the panel by means of a plurality of straps extending from the end of the nut part to the leg.

5 Claims, 3 Drawing Sheets

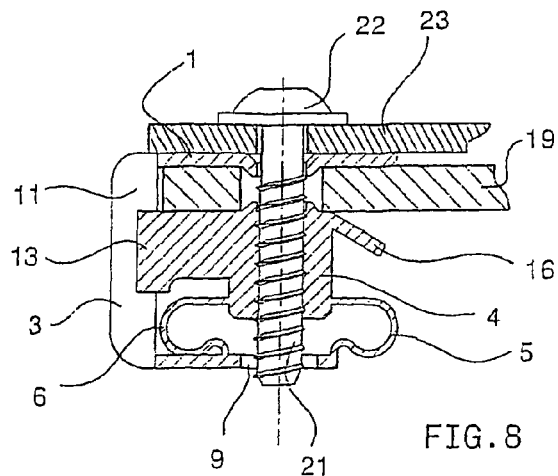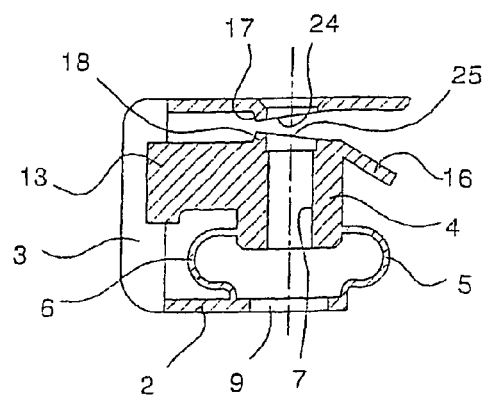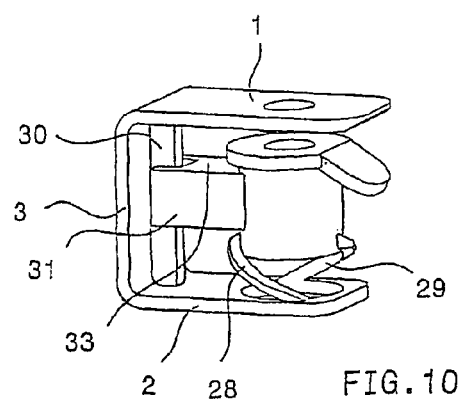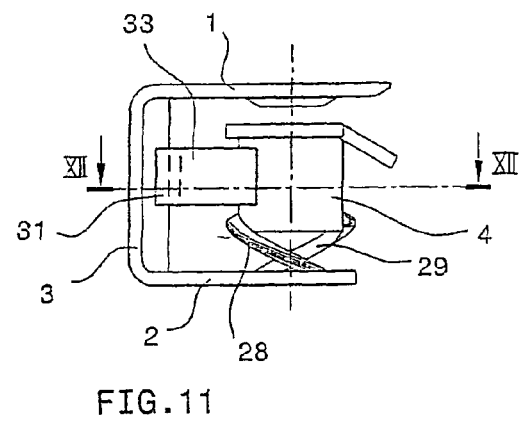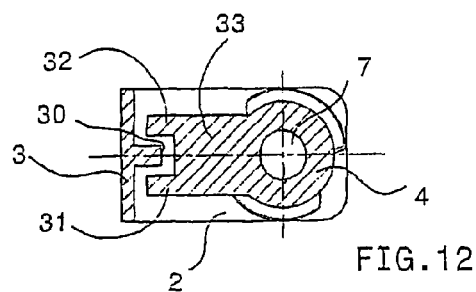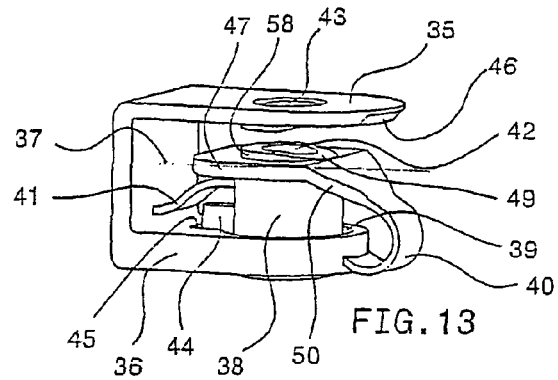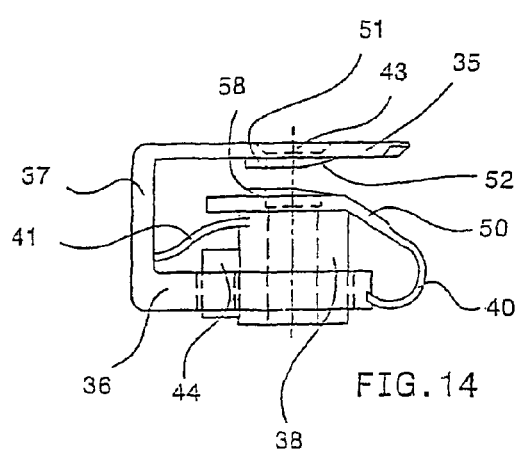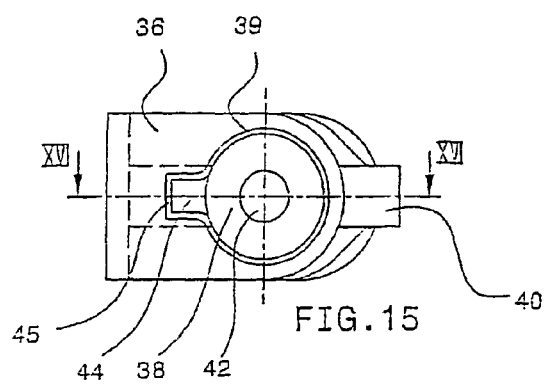

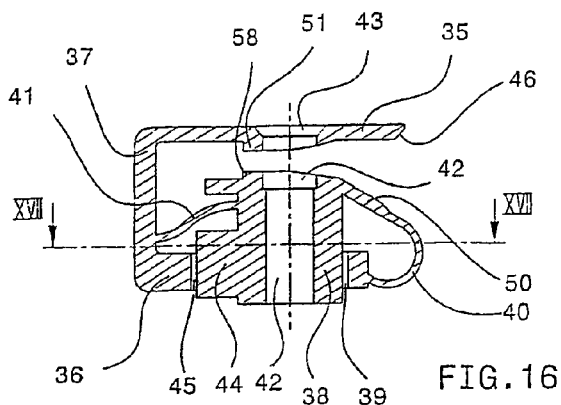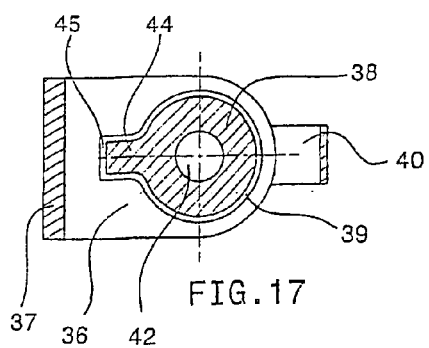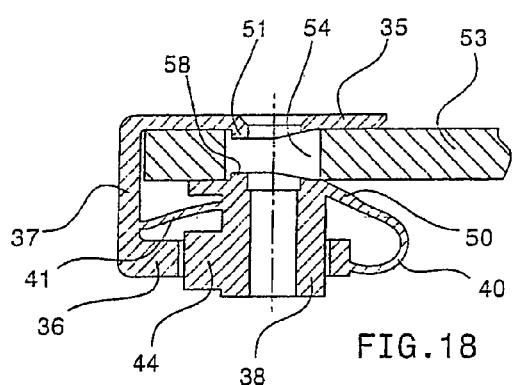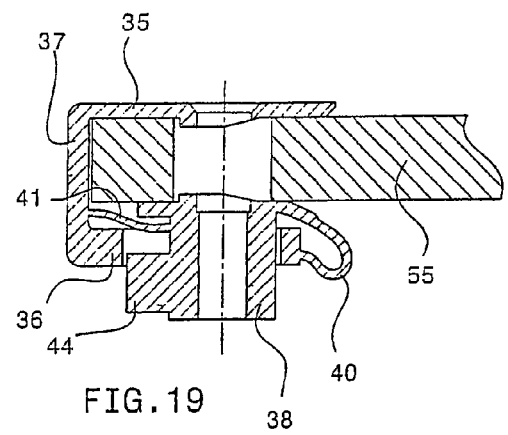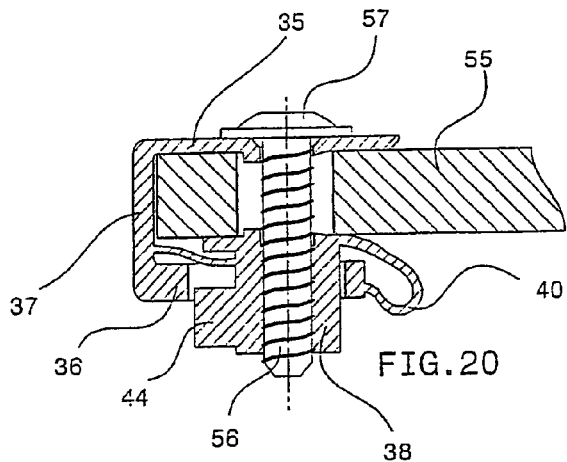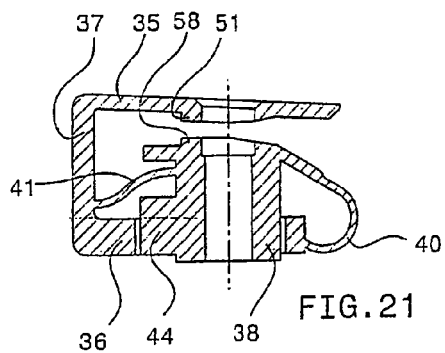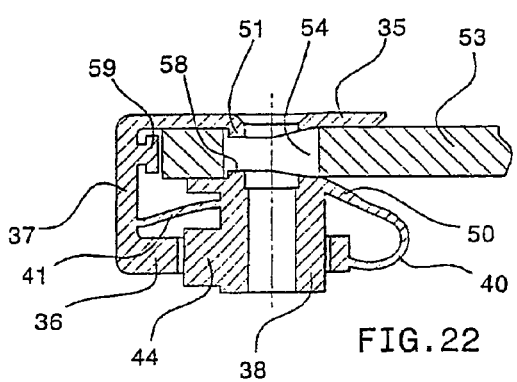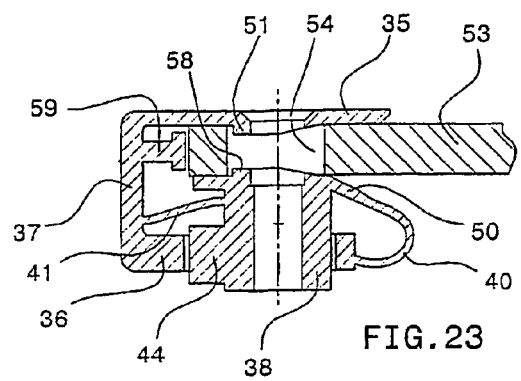

U-SHAPED CLAMPING PIECE

The invention relates to a U-shaped clamping piece for attachment to a panel provided with an opening, having two flat legs, connected by a yoke, with a nut part axially movably disposed between the two legs for receiving a bolt, said bolt penetrating the opening and one leg, wherein said nut part is non-rotatably held on the clamping piece by a lateral arm.

The purpose of such clamping pieces is to secure a component to a panel by means of a bolt, this requiring the panel to be provided with a nut part to receive the bolt, because, usually, the panel itself is not suitable for accommodating a thread into which a bolt can be screwed. The clamping piece allows a nut part to be brought into the region of the opening in the panel, with the result that, by means of the bolt and the nut part, the component can then be screwed to the panel.

In this respect, reference is made to European patent specification 0 353 468 B1, which discloses a clamping piece of the initially mentioned design in which a nut part is integrally formed on one of the legs, wherein said nut part receives a bolt which penetrates the opening in the panel and the other leg. Either the clamping piece is slipped onto the panel at the edge thereof or the panel has a mounting recess in the vicinity of the opening for the bolt in the panel. The clamping piece is inserted into said mounting recess and is slipped onto the panel over one edge of the mounting recess such that the nut part of the clamping piece aligns with the opening in the panel. Similar designs with a nut part integrally formed on one of the legs are disclosed in U.S. Pat. No. 4,333,211, French patent application 2 492 015, European patent application 0 199 614 A1, European patent application 1 336 763 A2 and German patent application publication 26 52 138.

According to the line of thinking evident from these publications, the design of the U-shaped clamping piece with the gap between its two legs meant that it was destined for use in panels whose thickness was broadly similar to said gap. A simple adaptation of the clamping piece to different panel thicknesses is either not possible at all with the known clamping pieces or is possible only with difficulty, as emerges, for example, from EP 1 336 763 A2, in which, for the purpose of adaptation to different panel thicknesses, its one leg is provided with a bent portion directed towards the panel, said bent portion being more or less stretched depending on the thickness of the thereby engaged panel. This results, especially in the case of thinner panels, in the disadvantage of contact by the bent leg only in the region of some points, at any rate not over a stretched area, this considerably restricting the stability of the connection between a panel carrying the clamping piece and a component to be secured to the panel.

Further known from U.S. Pat. No. 3,145,753 and U.S. Pat. No. 3,118,480 are U-shaped clamping pieces with axially movably disposed nut part, wherein said nut part is non-rotatably held on the clamping piece by a lateral arm and, by reason of its axial movability, is able to receive panels of different thickness, wherein, when the bolt is inserted and tightened, the nut part is drawn to the panel and then snugly engages the panel. Here, the nut part is held in position by means of a clip connected to the nut part and extending therefrom to the yoke, wherein, in U.S. Pat. No. 3,145,753, said clip loosely embraces the yoke in the manner of a fork or, in the illustrative embodiment in U.S. Pat. No. 3,118,480, loosely penetrates the yoke with a hook. Such loose mounting of the nut part harbors the risk that the loose fork-like or hook-like connection between the clip and the yoke will tilt and thus render more difficult the necessary aligning of the nut part for insertion and screwing in of the bolt.

Therefore, the object of the invention is to design the U-shaped clamping piece according to the initially described design such that said clamping piece always securely guides the nut part, even in the case of considerable axial displacement as a consequence of attachment to a particularly thin or particularly thick panel, thereby safely preventing the tilting of the leg holding the nut part. The object of the invention is achieved in that the nut part is secured by its end in axially resilient manner to the leg facing away from the panel by means of a plurality of straps extending from the end of the nut part to the leg.

As a result of said connection between the nut part and the relevant leg by means of at least two resilient straps, said nut part is securely guided upon insertion of a thick panel or when the nut part is drawn to a thin panel, said secure guiding considerably facilitating and improving the manipulation of the U-shaped clamping piece.

A variation on a design with two resilient straps consists in that the nut part is secured by its end facing the panel to the leg facing away from the panel by means of a flexible strap and to the yoke by means of a further flexible strap, wherein its lateral arm non-rotatably engages a recess in the leg facing away from the panel.

The design of one of the straps as a connection between nut part and yoke results in especially secure guiding for the relevant side of the nut part, without loss of the required flexibility of the nut part.

The clamping piece according to the invention makes it possible to receive panels of considerably different thicknesses, wherein, upon insertion and tightening of the bolt, the nut part is drawn to the panel and then snugly engages the panel, the flat leg facing the panel likewise being in snug contact with the relevant surface of the panel, which panel is in this manner held by the one flat leg and the nut part, without there being any resilient parts therebetween. This results, therefore, in the particularly stable fixing of the nut part to the panel and thus, by means of the bolt, also of a further component to the panel, with the consequence that the panel, provided with the clamping piece according to the invention, is capable of taking up considerable forces acting on the bolted-on component, wherein the design of the nut part with its lateral arm ensures that the bolt, which penetrates the nut part, can also be tightly fastened, because the arm ensures, via the clamping piece, that the nut part is non-rotatably held by means of the arm.

There are various possibilities for the non-rotatable design of the nut part. For example, the yoke may form with the arm a longitudinally movable fork guide. Alternatively, it is possible for the yoke to be provided with a longitudinal rib, said longitudinal rib being embraced by two projections at the end of the arm. A further possibility consists in providing the yoke with a longitudinal slit, said longitudinal slit being engaged by a projection of the arm. Said longitudinal slit may be formed by two parallel longitudinal ribs on the yoke.

In order to limit the lateral displacement of the nut part towards the arm, the projection is advantageously of such design that it engages behind the yoke with a widened portion. This prevents the nut part from moving away from the yoke. Alternatively, it is also possible for the arm to be of such design that it transitions via a shoulder into the projection, wherein, in relation to a longitudinal displacement of the arm, said projection forms a stop against the yoke. This ensures that the nut part is unable to move towards the yoke.

The straps which extend from one of the legs are advantageously of such design that they are arc-shaped. Alternatively, it is also possible for the straps to be have a form like a helical spring.

In order to facilitate the insertion of a panel into the clamping piece, the nut part is advantageously provided on its side facing the panel with a tab forming an insertion bevel for the panel.

In order to afford the clamping piece a certain positional security in relation to the panel and therefore to the opening in the panel, the leg facing the panel may be provided with a nozzle designed for insertion into the opening. Furthermore, it is also possible for the nut part to be provided on its side facing the panel with a ring projecting into the opening. In order to ensure that the insertion of the panel into the clamping piece is not in any way impeded by the nozzle or the ring, the nozzle or ring is provided with a sloping portion to facilitate introduction of the panel. When the panel then comes up against said sloping portion, the sloping portion steers the nozzle or ring into the opening in the panel.

The recess for establishing non-rotatability between the nut part and the legs is advantageously in the form of a slit in the leg facing away from the panel.

In order to guarantee that the clamping piece can be premounted, it is advantageously of such design that the leg facing the panel and the nut part are so aligned that the nut part and the leg clamp the panel when the panel has been received. Such alignment makes it possible for the clamping piece first to slide over the edge of the panel, wherein, owing to its inherent tension, the clamping piece then first of all clamps itself to the panel up until such time as there is final fixing through the insertion and tightening of a bolt into the nut part.

In order to limit the movement when a panel is being inserted into the clamping piece, a stop piece may advantageously be formed on the yoke, wherein, having been inserted into the clamping piece, the panel comes up against said stop piece for the purpose of limiting the insertion depth.

The clamping piece is of such design that it is very well suited to being of one-piece construction in plastic, being produced, for example, by injection moulding.

The clamping piece is of such design that it is very well suited to being of one-piece construction in plastic, being produced, for example, by injection moulding.

Illustrative embodiments of the invention are presented in the drawings, in which:

FIG. 8 shows the same clamping piece with a component bolted to the panel;

FIG. 9 shows the clamping piece in section along line IV-IV from FIG. 3 with bevelled nozzle and ring;

FIG. 10 shows a clamping piece with helical-spring-like straps for fixing the nut part;

FIG. 11 shows a side elevation view of the clamping piece according to FIG. 10;

FIG. 12 shows a section along line XII-XII from FIG. 11;

FIG. 13 shows a further development of the clamping piece, in a perspective view;

FIG. 14 shows a side elevation view of said clamping place;

FIG. 15 shows a view from below of the clamping piece according to FIG. 14;

FIG. 16 shows a section through the clamping piece along line XVI-XVI from FIG. 15;

FIG. 17 shows a section through the clamping piece along line XVII-XVII from FIG. 16;

FIG. 18 shows a section similar to the section in FIG. 16 with a relatively thin panel receiving the clamping piece;

FIG. 19 shows the same clamping piece with a relatively thick panel;

FIG. 20 shows FIG. 19 with a bolt having been inserted;

FIG. 21 shows the clamping piece in section according to FIG. 16 with one leg bent towards the nut part;

FIG. 22 shows the clamping piece, provided with a stop piece;

FIG. 23 shows the same clamping piece with a stop piece which has been elongated in comparison with the design according to FIG. 22.

Figure 1:
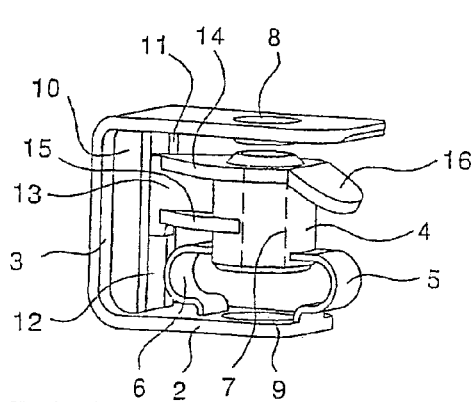
FIG. 1 shows the clamping piece with fixing of the nut part by means of arc-shaped straps, in a perspective view.

The clamping piece presented in a perspective view in FIG. 1 contains the upper leg 1, the lower leg 2 and the yoke 3, which connects the two legs 1 and 2. The clamping piece is made of a material which allows the two legs 1 and 2 to bend up in relation to the yoke 3 and to spring back when a panel is inserted into the clamping piece, as will be explained in connection with FIGS. 7 and 8.

Disposed between the two legs 1 and 2 is the nut part 4, which is integrally joined to the leg 2 via the arc-shaped straps 5 and 6. The straps 5 and 6, which are likewise of resilient material, afford the nut part 4 a mobility in the axial direction with respect to the nut part 4. The nut part 4 contains the hole 7, into which hole 7 a bolt can be screwed, as is presented in connection with FIG. 8. To be able to introduce a bolt into the nut part 4, the leg 1 is provided with the aperture 8. The leg 2 also has a similar aperture 9, with the consequence that the entire clamping piece can be penetrated by a bolt (see FIG. 8). Since, when a bolt is screwed into the hole 7 of the nut part 4, a torque is exerted on the nut part 4, an anti-rotation device is provided to prevent the co-rotation of the nut part 4, said anti-rotation device being of the following design: the yoke 3 is provided with two longitudinal ribs 10 and 11, which longitudinal ribs 10 and 11 form between them a longitudinal slit 12 which is engaged by a projection 13 carried by the arms 14 and 15, which arms 14 and 15 project from the nut part 4. This gives rise to a torque-proof connection between the nut part 4 and the projection 13, which projection 13 engages the longitudinal slit 12 and, because of its contact with the longitudinal ribs 10 and 11, is prevented from being co-rotated when a torque is exerted on the nut part 4. Said anti-rotation device is, therefore, a longitudinally movable fork guide.

Figure 7:
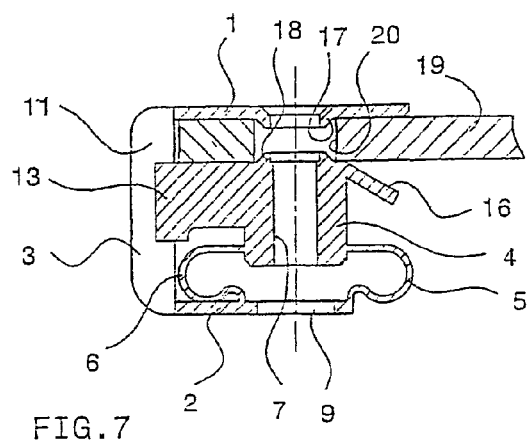
FIG. 7 shows the same clamping piece in section, attached to a panel.

The nut part 4 is further provided with the tab 16, which tab 16 forms an insertion bevel for a panel to be inserted between leg 1 and nut part 4 (see FIG. 7).

Upon insertion of a panel between the leg 1 and the nut part 4, the nut part 4 is forced away towards the leg 2, the straps 5 and 6 being correspondingly pressed together and thus providing sufficient clearance for the insertion of a panel, this being discussed more fully in connection with FIGS. 7 and 8.

Figure 2:
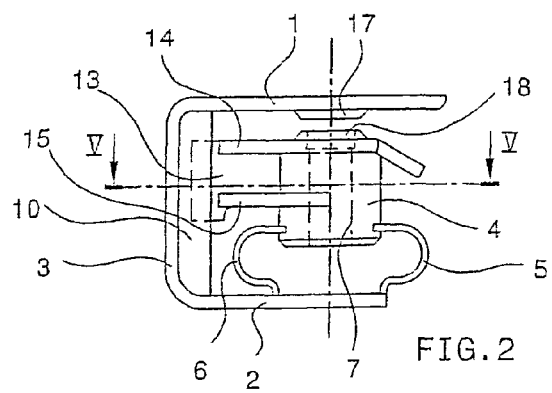
FIG. 2 shows the same clamping piece in a side elevation view.

FIG. 2 presents the clamping piece from FIG. 1 in a side elevation view. It is evident from FIG. 2 that the projection 13 (drawn with a broken line) is able to slide up and down in the longitudinal slit behind the longitudinal rib 10 in order to provide sufficient space between the leg 1 and the nut part 4 for the insertion of panels of different thickness.

FIG. 2 further shows the nozzle 17 and the ring 18, which are provided for penetration into a corresponding opening in an inserted panel, thereby affording the clamping piece a certain security of seating with respect to a panel (see FIGS. 7 and 8).

Figure 3:
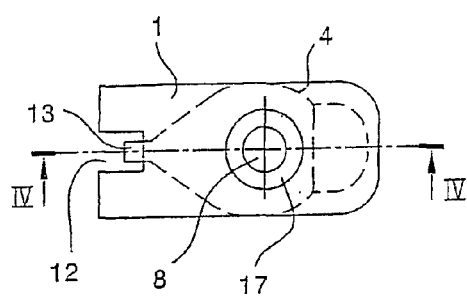
FIG. 3 shows the same clamping piece in a top plan view.

FIG. 3 shows the clamping piece in a top plan view, only the leg 1, the projection 13, the longitudinal slit 12, the aperture 8 and the nozzle 17 being directly visible. The position of the nut part 4 is indicated by the broken line.

Figure 4:
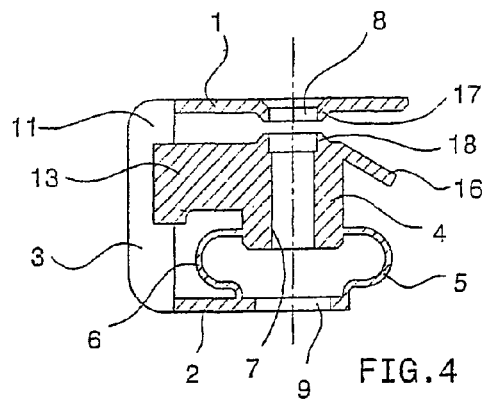
FIG. 4 shows the same clamping piece in section along line IV-IV from FIG. 3.

FIG. 4 presents the clamping piece from FIGS. 1 and 2 in section along line IV-IV from FIG. 3, it becoming clear therefrom that a bolt can be inserted into the clamping piece through the apertures 8 and 9 and the hole 7 in the nut part 4.

Figure 5:
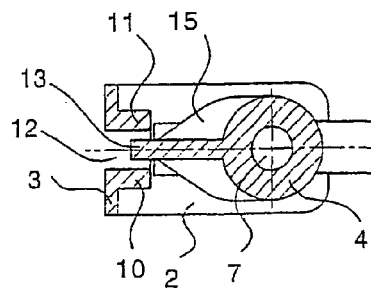
FIG. 5 shows a section along line V-V from FIG. 2.

FIG. 5 presents the clamping piece from FIGS. 1 and 2 along line V-V, it becoming clear therefrom how the projection 13 is held as an anti-rotation device in the longitudinal slit 12 between the two longitudinal ribs 10 and 11.

Figure 6:
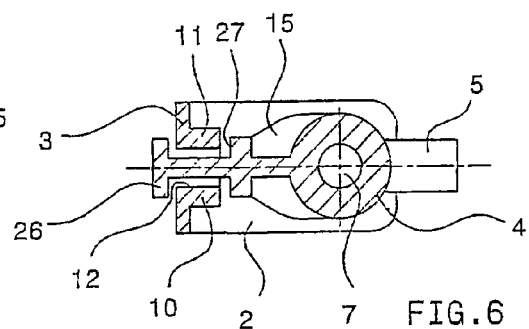
FIG. 6 shows a section along line V-V from FIG. 2 with a projection on the arm for limiting the longitudinal displacement of the arm.

FIG. 6 presents a variation on the design of the clamping piece from FIG. 5 in which the projection 13 transitions into the widened portion 26. In addition, the arm 15 is provided with the shoulder 27, which shoulder 27 forms a stop against the longitudinal ribs 10 and 11.

FIG. 7 shows a section through the clamping piece similar to the section presented in FIG. 4, albeit with a panel 19 having been inserted between the leg 1 and the nut part 4. The panel 19 is provided with the opening 20, through which opening 20 a bolt can be inserted, wherein the nozzle 17 and the ring 16 on the nut part ensure that, having been inserted, the panel 19 with its opening 20 can initially be securely held without requiring additional fixing by a bolt.

FIG. 7 clearly shows, in relation to FIG. 4, that, through the insertion of the panel 19, the nut part 4 is pressed against the leg 2, with the result that the two straps 5 and 6 have been pressed together to a greater extent than is the case in FIG. 4, where a panel has not been inserted. It is also evident therefrom that, according to the flexibility of the straps 5 and 6 and their clearance as far as the leg 2, the nut part 4 affords a large width of variation with regard to the thickness of the panel 19 to be inserted, the consequence of which is that the U-shaped clamping piece according to the invention is particularly well suited to being attached to panels with a considerable variation of thickness. In particular, a variation of several millimetres enters into consideration in this regard.

FIG. 8 presents the clamping piece from FIG. 7 with inserted panel 19 and with screwed-in bolt 21, which bolt 21 is here in the form of a self-tapping bolt and has cut its own thread in the nut part 4. It should be pointed out, however, that it is alternatively possible, of course, to use nut parts which are already provided with preformed threads. The bolt 21 is received by the nut part 4 and, with its bolt head 22, presses a component 23 against the leg 1 and therefore indirectly against the panel 19, thereby securing the component 23 to the panel 19 by means of the bolt 21 and the nut part 4.

FIG. 9 presents a variation on the clamping piece from FIG. 4, wherein, in FIG. 9, there is a bevelled nozzle 24 and a bevelled ring 25. Said bevels afford easier introduction of a panel 19 (see FIG. 7), with the result that it is possible, in particular, for an especially thick panel to be easily inserted against the spring force of the legs 1 and 2, which legs 1 and 2 are held together by the yoke 3.

FIG. 10 presents a perspective view of the U-shaped clamping piece from FIGS. 1 and 2, this time with a variation on the connection between the nut part 4 and the leg 2. Here, said connection consists of straps 28 and 29 which are like helical springs, said straps 28 and 29 providing particularly advantageous resilience for the axial movability of the nut part 4. Furthermore, the longitudinally movable fork guide, acting as an anti-rotation device for the nut part 4, is of a design which differs from the aforementioned drawings. In this case, said fork guide consists of the single longitudinal rib 30, which longitudinal rib 30 is embraced by two projections 31 and 32 of the arm 33 (see FIG. 12).

FIG. 11 presents the perspective design from FIG. 10 in a side elevation view.

FIG. 12 shows the clamping piece presented in FIGS. 10 and 11 in section along line XII-XII from FIG. 11. FIG. 12 clearly shows the herein employed fork guide, which fork guide consists of the single longitudinal rib 30 and the two projections 31 and 32.

The clamping piece presented in a perspective view in FIG. 13 is a variation on the design according to FIGS. 1 to 4. The clamping piece in FIG. 13 contains the upper leg 35, the lower leg 36 and the yoke 37, which yoke 37 connects the two legs 35 and 36. With regard to the material of the clamping piece, reference is made to the explanatory remarks in relation to FIG. 1. Disposed between the two legs 35 and 36 is the nut part 38, which nut part 38 here penetrates a recess 39 in the lower leg 36. The nut part 38 is connected, respectively, by the strap 40 and the strap 41 to the lower leg 36 and the yoke 37, wherein the straps 40 and 41, which are of resilient material, afford the nut part 38 (as also in the illustrative embodiment presented in FIGS. 1 to 4) the required axial movability. In this case, in contrast to the illustrative embodiment presented in FIGS. 1 to 4, the strap 40 is positioned at the end of the nut part facing the upper leg 35, this increasing the movability of the nut part 38 in relation to the two legs 35 and 36. The nut part 38 contains the hole 42, into which hole 42 a bolt can be screwed (see FIG. 20). In order to be able to introduce a bolt into the nut part 38, the upper leg 35 is provided with the aperture 43. Having been inserted into the clamping piece, a bolt is thus able, starting from the aperture 43, to penetrate the nut part 38 over the entire length thereof. In order to intercept any torque exerted on the nut part 38 as a bolt is being screwed in, there is provided as an anti-rotation device the lateral arm 44, which lateral arm 44 engages the recess 45 in the lower leg 36. This design ensures that the nut part 38 cannot be co-rotated when a torque is applied thereto.

In order to facilitate the insertion of a panel (see FIGS. 18 and 19) into the space between the upper leg 35 and the nut part 38, the upper leg 35 is provided with a bevel 46. The nut part 38 is provided on its side facing the upper leg 35 with the flange 47. The flange 47 is provided on its side facing the bevel 46 with the stop piece 58 with the bevel 49, wherein those two parts which face a panel upon insertion, namely the upper leg 35 and the nut part 38, facilitate such insertion through appropriate design with the bevels 46 and 49. In addition, the introduction of a panel is facilitated by the thickened portion 50 at the end of the strap 40 facing the nut part 38, which strap 40 here acts as an insertion bevel.

The clamping piece from FIG. 13 is presented in a side elevation view in FIG. 14 which clearly shows the movable mounting of the nut part 38 by means of the two straps 40 and 41. It is further evident from FIG. 14 that the aperture 43 in the upper leg 35 forms a stop piece 51 on the side facing the nut part 38, said stop piece 51 being provided with the insertion bevel 52 on the side facing a panel to be inserted.

FIG. 15 presents the clamping piece from FIG. 14 in a view from below. It is made clear by FIG. 15 that the anti-rotation device is formed by the lateral arm 44 on the nut part 38 and by the recess 45 in the lower leg 36. Because of its small distance from the walls of the recess 45, the lateral arm 44 can be rotated only slightly, with the consequence that, when a bolt is being screwed in, the nut part 38 is allowed only a very small degree of co-rotation.

FIG. 16 presents a section through the clamping piece along line XVI-XVI from FIG. 15, clearly showing the axially movable mounting of the nut part 38.

FIG. 17 shows the clamping piece in section along line XVII-XVII from FIG. 16. FIG. 17 clearly demonstrates that the nut part 38 is able to move axially with sufficient clearance in relation to the lower leg in the recess 39 thereof.

FIG. 18 shows the clamping piece presented in FIGS. 13 to 17, this time with a panel 53 having been inserted, wherein said panel 53 is provided with the opening or hole 54 for receiving a bolt. Projecting into said hole 54, on the side of the upper leg 35, are the stop piece 51 and, on the other side, the stop piece 58, this ensuring that, having been inserted into the clamping piece, the panel 53 cannot again be removed.

A similar design is presented in section in FIG. 19, where the only difference in comparison with FIG. 18 is that, in FIG. 19, a considerably thicker panel 55 has been inserted into the clamping piece.

FIG. 20 presents the clamping piece with the panel 55 from FIG. 19, the bolt 56 having been screwed into the clamping piece, said bolt 56 completely penetrating the nut part 38 and pressing the nut part 38 against the panel 55 from the side of the lower leg 36. Pressing against the panel 55 from the other side is the leg 55, on which leg 55 is seated the head 57 of the bolt 56. After the bolt 56 has been fitted, therefore, the clamping piece is securely connected to the panel 55. If it is now necessary for some other component to be screwed to the panel 55, then this is accomplished in a manner not presented here in that the bolt 56, having first penetrated such non-presented component, then presses it against the leg 35, the bolt 56 then drawing such component securely against the panel 55 by means of the nut part 38.

FIG. 21 illustrates a peculiarity of the clamping piece shown in the hereinbefore presented drawings, namely a preload between the upper leg 35 and the nut part 38. As can be seen, the leg 35 is bent towards the leg 36 and must, upon insertion of a panel (e.g. 53 or 55 in FIGS. 18 and 19, respectively), bend up slightly in order then, with its stop piece 51 and the stop piece 58, to spring into the hole in an inserted panel. This permits the premounting of the clamping piece, this being of significance in many applications in the case of automated production.

FIG. 22 presents the clamping piece, which corresponds to the design according to FIGS. 13 to 21, with a panel 53 having been inserted, wherein, as viewed in the direction of insertion, the front side of said panel 53 is positioned directly before the stop piece 59. When fully inserted, the panel 53 will contact the stop piece 59. The gap shown in FIG. 22 between the stop piece 59 and the front side of the panel 53 is thus presented here only for graphical reasons and in order to facilitate comprehension.

FIG. 23 presents a variation on the stop piece 59, wherein, in comparison with the design shown in FIG. 22, said stop piece 59 is of greater length, with the consequence that a clamping piece provided with such a stop piece is capable of receiving a correspondingly shorter panel in the region between its opening and the front side of the panel 23 with limitation of the screwing-in depth.

What is claimed is:

1. A U-shaped clamping piece for attachment to a panel (53, 55) provided with an opening (54), having two flat legs (35, 36), connected by a yoke (37), with a nut part (38) axially movably disposed between the two legs (35, 36) for receiving a bolt (56) penetrating the opening (54) and one leg (35), wherein said nut part (38) is non-rotatably held on the clamping piece by a lateral arm (44), characterized in that an upper surface of the nut part (38) is adapted to be positioned adjacent to the panel (53, 55) by a flexible strap (40) connected to the leg (36) and by a further flexible strap (41) connected to the yoke (37), wherein its lateral arm (44) non-rotatably engages a recess (45) in the leg (36).

2. The U-shaped clamping piece according to claim 1, characterized in that the recess (45) is in the form of a slit.

3. The U-shaped clamping piece according to claim 1, characterized in that the one leg (35) adapted to be positioned adjacent to the panel (53, 55) and the nut part (38) are so aligned that the nut part (38) and the leg (35) clamp the panel (53, 55) when the panel (53, 55) has been received.

4. The U-shaped clamping piece according to claim 1, characterized in that a stop piece (58) is formed on the yoke (37), wherein said stop piece (58) limits an insertion depth.

5. The U-shaped clamping piece according to claim 1, characterized in that said clamping piece is of one-piece design.

* * * * *